Sept. 4, 1956 L. S. GREENLAND 2,761,495
FUEL SUPPLY SYSTEMS
Filed Jan. 21, 1953 3 Sheets-Sheet 1

Inventor
Leonard Sidney Greenland
By Moses, Nolte, Crews and Berry
Attorneys

Sept. 4, 1956     L. S. GREENLAND     2,761,495
FUEL SUPPLY SYSTEMS

Filed Jan. 21, 1953     3 Sheets-Sheet 3

Inventor
Leonard Sidney Greenland
By Moses, Nolte, Crew and Berry
Attorneys

United States Patent Office 2,761,495
Patented Sept. 4, 1956

2,761,495

FUEL SUPPLY SYSTEMS

Leonard Sidney Greenland, Compton, Wolverhampton, England, assignor to H. M. Hobson Limited, London, England, a British company Application January 21, 1953, Serial No. 332,285

Claims priority, application Great Britain January 21, 1952

7 Claims. (Cl. 158—36.4)

This invention relates to apparatus for supplying fuel to a gas turbine engine, which will control the rate of acceleration of the engine from starting to a controlled speed and will maintain the engine running at the controlled speed, when reached.

To accelerate a gas turbine engine to a controlled speed it is necessary to supply to the engine fuel in excess of the quantity determined by the engine consumption curve for steady running and the supply of such excess fuel to the engine is herein referred to as "overfuelling." In order, however, to avoid risk of compressor stall it is necessary, particularly during an initial critical range of engine speed, severely to restrict the amount of overfuelling although a greater degree of overfuelling is permissible when the engine speed has reached a value in excess of the upper limit of said critical speed range. It is the object of this invention to provide for rapid acceleration of the gas turbine engine to its controlled speed while at the same time so controlling the fuel flow to the engine that excessive over-fuelling is avoided throughout the period of acceleration.

The apparatus according to the invention comprises an engine driven fuel pump, a device for controlling the flow of fuel from the pump to the engine which is effective to prevent excessive over-fuelling during a critical range of engine speed but to permit of substantial overfuelling when the upper limit of said speed range is reached, and a speed governor, also controlling the flow of fuel from the pump to the engine, which is inoperative until the speed of the engine is above the critical range and comprises a speed-responsive element and an acceleration responsive element which, in combination, regulate the amount of fuel pumped to the engine so that the controlled speed is approached with a diminishing rate of acceleration and is finally reached as the acceleration is reduced to zero, thereby eliminating overshoot, the speed being maintained at the controlled value by the combined action of the speed and acceleration responsive elements of the governor irrespective of variations in engine load.

One embodiment of the invention will now be described in detail, by way of example, with reference to the accompanying drawings, in which.

The installation comprises a gas turbine engine 100 (Fig. 7), a fuel pump 101 driven thereby, an inlet pipe 102 for supplying fuel to the pump and a discharge pipe 103 by which fuel is fed from the pump to the burners of the engine.

Figure 1:
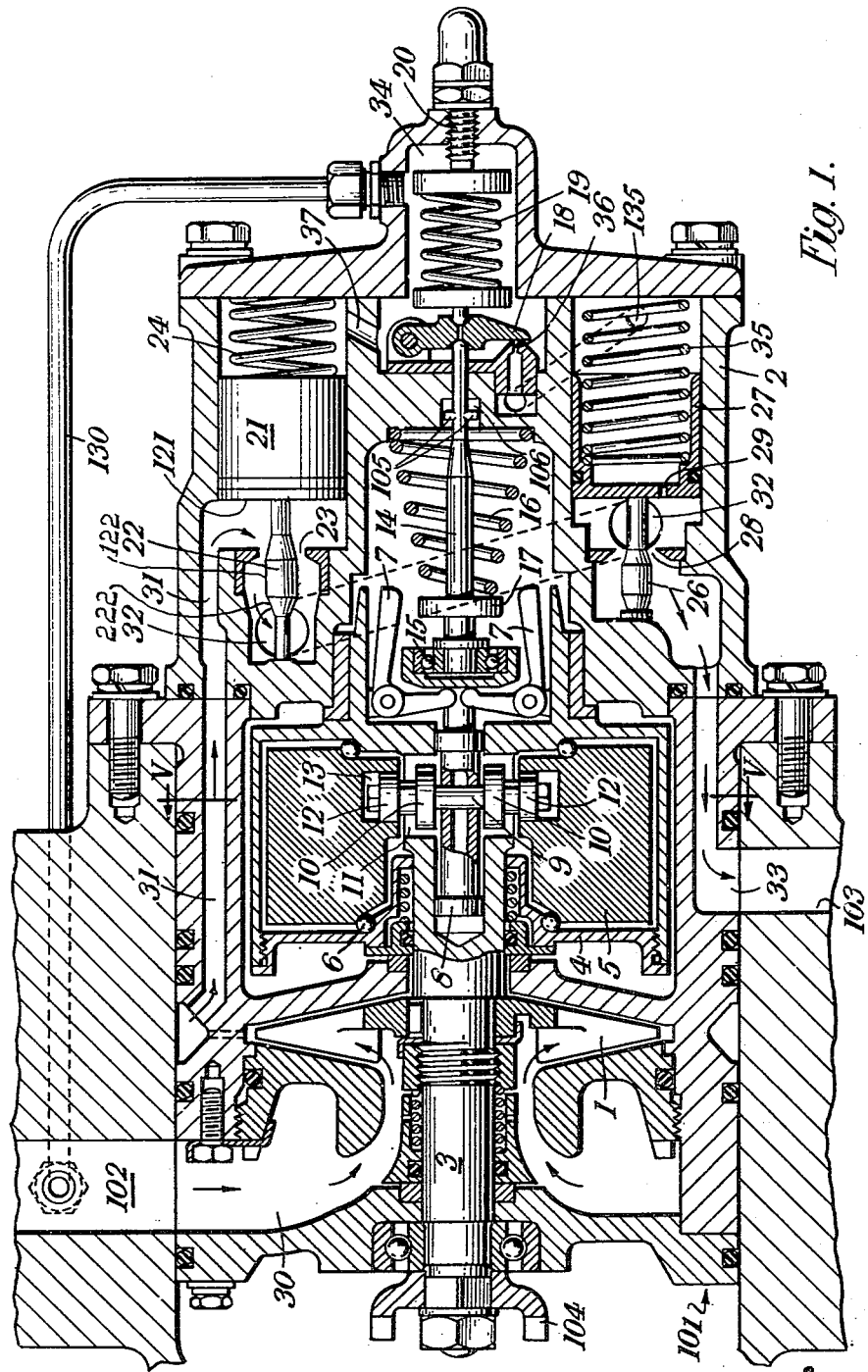
Fig. 1 is a diagrammatic longitudinal section through the fuel pump.
Figure 7:
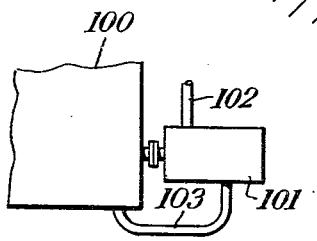
Fig. 7 shows diagrammatically the operative relationship of the gas turbine engine and the pump and, Fig. 8 is a detailed view showing an alternative arrangement.

Turning now to Fig. 1 first of all, the pump 101 comprises a casing, within which are mounted a shaft 3 driven by the engine, a centrifugal pumping member 1 and various elements referred to later for controlling the supply of fuel to the engine. Fuel from an inlet 30, communicating with the inlet pipe 102, is pumped to an orifice 23 along a duct 31 by the centrifugal pumping element 1, mounted on the shaft 3, which carries dogs 104 by means of which it is driven by the gas turbine engine 100 (Fig. 7). The effective area of the orifice 23 is controlled by a valve 22, and the fuel passes thence through a passage 32 to an orifice 28, the effective area of which is controlled by a metering valve 26, and from the orifice 28 to an outlet 33 communicating with the discharge pipe 103. The valve 22 is an over-fuelling control valve and is constituted by a profiled needle connected to a pressure sensitive device, in the case illustrated a piston 21, loaded by a spring 24 and subject, at the valve side 121, to the pump delivery pressure. A duct 37 connects the space at the right hand side of the piston 21 to a space 34 connected to the inlet 30 by a conduit 130. The metering valve 26 is servo operated, under control of a governor-controlled plate valve 18, and consists of a profiled needle mounted on a pressure sensitive device, in the case illustrated a piston 27, loaded by a spring 35. The piston 27 has a bleed 29 across it and the space on the spring side of the piston is connected by a duct 135 to an orifice 36, controlled by the plate valve 18, which communicates with the space 34 and therefore with the inlet of the pump.

Figure 5:
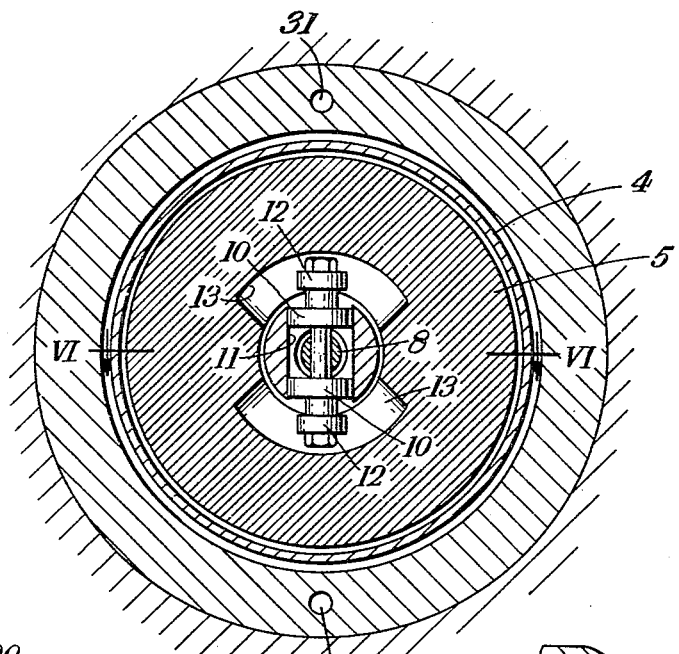
Fig. 5 is a section on the line V—V in Fig. 1.
Figure 6:
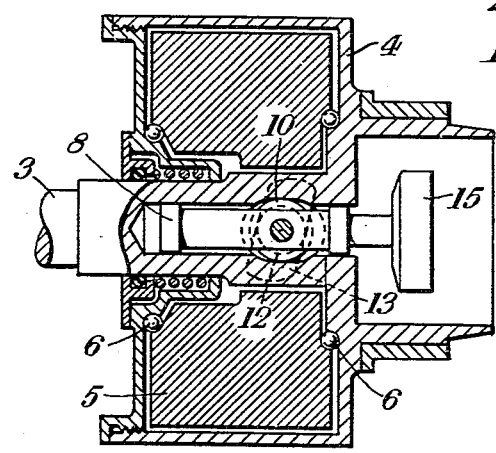
Fig. 6 is a section on the line VI—VI in Fig. 5.

The metering valve 26 which is subject to the pump delivery pressure less the pressure drop across the over-fuelling control valve 22 is servo controlled, through the agency of the plate valve 18, by a speed governor comprising a centrifugal element and an inertia element. The centrifugal element is constituted by bob weights 7, pivoted to a casing 4 fixed to the shaft 3. The inertia element (see also Figs. 5 and 6) is constituted by a flywheel 5 mounted on anti-friction bearings 6 in the casing 4 and capable of limited rotation in relation to the shaft. The bob weights 7 of the centrifugal element of the governor act on a sliding member 8, disposed within the shaft 3 and carrying a pin 9, against the pressure of a spring 16. The pin 9 carries two sets of anti-friction bearings, the inner set 10 sliding in axial slots 11 in the shaft 3. Thus the sliding member 8 is able to move with the minimum of friction axially along the shaft but is constrained to turn with the shaft. The outer anti-friction bearings 12 engage inclined slots 13 in the flywheel 5. The slots 13 are so inclined, as shown in Fig. 6, that when the flywheel lags behind the shaft during acceleration of the engine the sliding member 8 is moved towards the spring 16, i. e. in the same direction as the movement imparted to it by the bob weights 7 when over-speeding occurs. The governor spring 16 opposing the bob weights 7 acts on a flange 17 integral with a post 14, urging the post against the sliding member 8 through the agency of an anti-friction bearing 15. Lugs 105 on the post 14 engage slots 106 in the casing 2 to prevent rotation of the post 14 and spring 16. The post 14 acts to open and close the plate valve 18. A second spring 19 acting on the side of the plate valve 18 remote from the post 14 is provided with an adjustable abutment screw 20 in order to vary the setting of controlled speed as desired.

Figure 2:
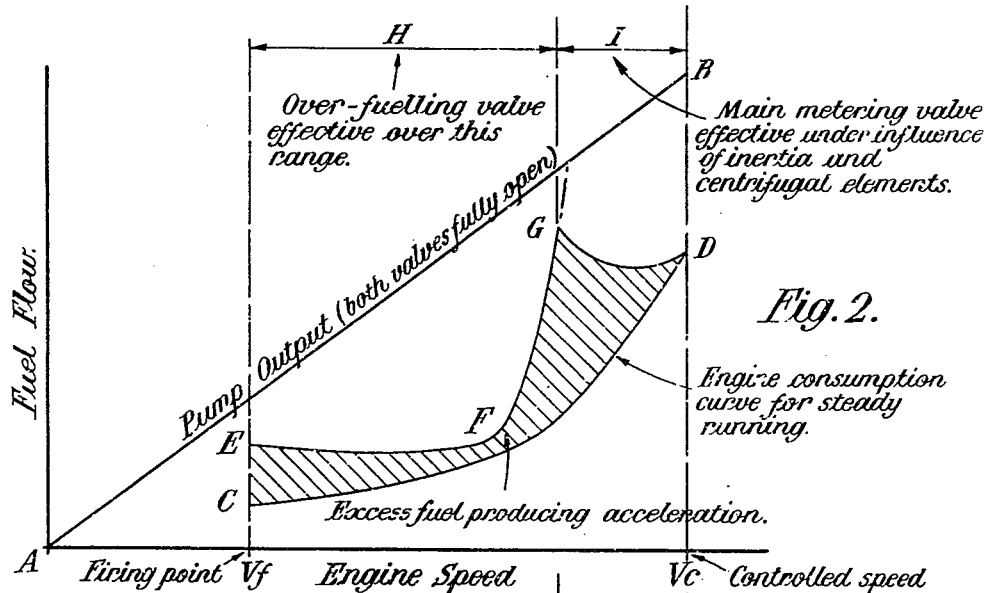
Figs. 2, 3 and 4 are graphs illustrating its operation.

In Fig. 2, which shows the amount of fuel available for accelerating the engine to the controlled speed, engine speeds are plotted as abscissae and fuel flow as ordinates and the line AB represents the unrestricted output of the pump, i. e. that which would be attained but for the restricting effect of the valves 22 and 26. The curve CD represents the sea level engine consumption curve for steady running at zero forward speed of the vehicle propelled by the engine. The curve E, F, G, D corresponds to the maximum over-fuelling curve permissible for accelerating the engine.

During acceleration there is usually a critical speed range, between the limits indicated by the points E, F, in which excessive over-fuelling may result in compressor stall and therefore the extent of over-fuelling must be held to fine limits. Beyond this range the engine can cope with comparatively large amounts of over-fuelling without the compressor stalling. The over-fuelling valve 22, which is effective over the speed range H, is profiled to give a limited amount of over-fuelling E, F relative to the steady running engine consumption curve C, D during acceleration through the critical speed range and thereafter to give a rapidly increasing amount of over-fuelling represented by F, G, until the engine has accelerated to a higher speed represented by the point G, the point G being reached when the piston 21 has moved against the spring 24 sufficiently for the valve 22 no longer to control the orifice 23. When the piston 21 moves to the right, under the pressure of the fuel delivered by the pump 1, the portion 122 of the valve 22 first of all controls the orifice 23 and restricts the fuel flow to the engine as indicated by EF in Fig. 2. Thereafter, in response to further acceleration of the engine, the piston 21 moves the valve 22 further to the right and the reduced nose portion 222 of the valve is then moved into the orifice 23 to permit of over-fuelling as indicated by FG in Fig. 2. But for the overfuelling valve 22, the fuel consumption curve during the range H (Fig. 2) of acceleration of the engine would be represented by the line A, B. The progressive closing of the orifice 23 (Fig. 1) by the valve 22, in response to increase in the delivery pressure of the pump, restricts the fuel consumption to EFG (Fig. 2) until such time as the valve 22 ceases to control the orifice 23. When the engine has accelerated to approximately 80% of the controlled speed Vc as indicated by the point G, it is desirable that the excess fuel and therefore the rate of engine acceleration should be progressively diminished so that the controlled speed is finally reached with zero acceleration and over-shooting avoided. This is achieved by the action of the valve 26, under control of the governor, as later explained. When the governor becomes operative it moves the valve 26 to the right to restrict the flow through the orifice 28 as indicated by GD in Fig. 2.

Figure 3:
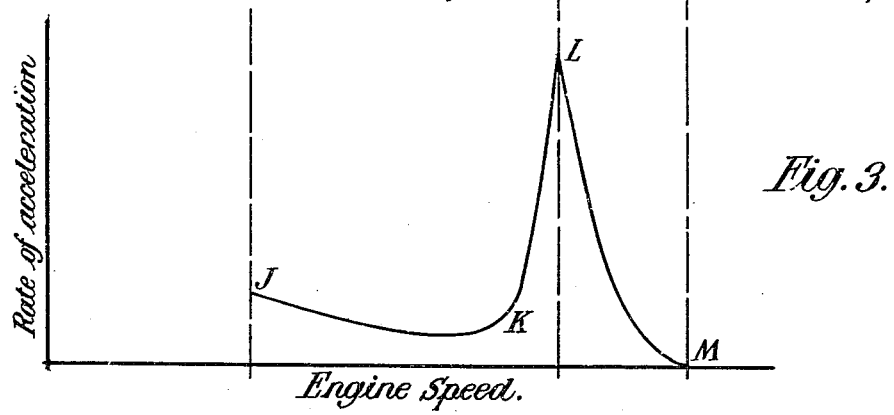
Figure 4:
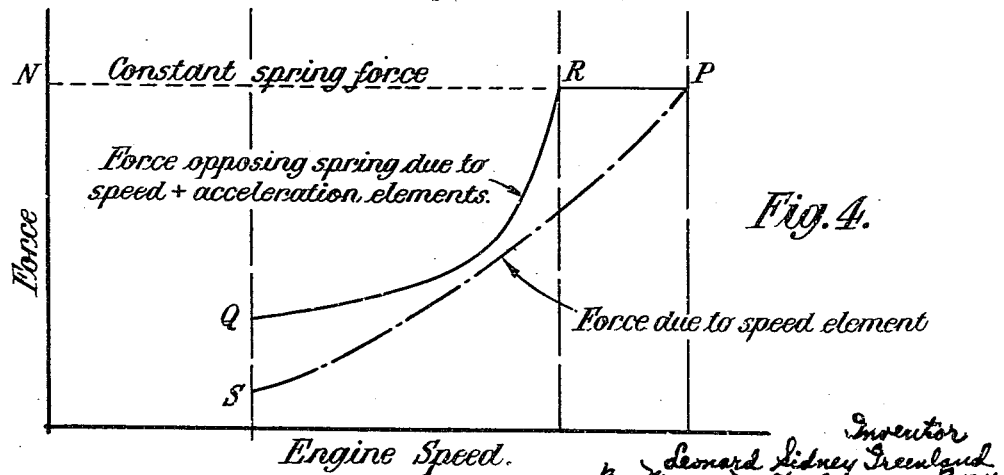

With the aid of a starting motor, the engine speed can be raised to the starting speed Vf at which, on firing, the engine is capable of accelerating without further external assistance. The variation in the rate of acceleration as the speed increases is shown by the curve JKLM in Fig. 3. This acceleration creates a tendency for the flywheel 5 to lag behind the drive shaft 3 producing a thrust on the sliding member 8 in opposition to the springs 16 and 19. Simultaneously, the bob weights 7 produce a similar effect as shown in Fig. 4. In Fig. 4, the constant force exerted by the springs 16, 19 is indicated by the line NP. The curve QR represents the force opposing the springs 16, 19 exerted by the centrifugal and inertia elements of the governor and the curve SP represents the opposing force exerted by the centrifugal element of the governor.

So long as the combined thrust of the acceleration and speed responsive elements is overbalanced by the springs, the control orifice 36 remains closed and the metering valve 26 is forced by its spring 35 into the full-open position shown in Fig. 1, the pressures on opposite sides of piston 27 being identical. This condition obtains over the speed range H as indicated in Fig. 4.

Beyond this range the combined thrust is sufficient to overpower the springs 16 and 19 and therefore acts to lift the valve 18 and open the orifice 36 so as to reduce the pressure on the spring side of the piston 27. This causes the piston 27 to move against its spring 35 and the metering valve 26 to restrict and thereby reduce the rate of fuel flow through the orifice 28. This in turn reduces the degree of over-fuelling and with it the rate of acceleration. The resulting accelerations and associated forces are shown in the speed range 1 of Figs. 3 and 4.

The profiled over-fuelling valve 22 is thus operative over the range H extending from the firing point Vf to a speed just above the upper limit of the critical speed range and then ceases to prevent over-fuelling and, due to resulting substantial acceleration of the engine, causes the metering valve 26 to become operative to control the speed over the remainder I of the speed range. The maximum or controlled speed Vc, determined by adjustment of the screw 20, is then maintained by the combined action of the speed and acceleration responsive elements of the governor.

Figure 8:
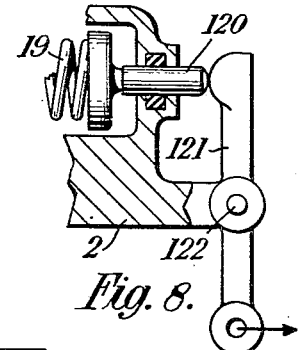

An engine fitted with the apparatus shown in the drawings is started and accelerated on the ground prior to release of the plane or missile to which the engine is fitted. The engine therefore runs at the controlled speed Vc prior to and during take-off and also during flight. The apparatus may, however, be used to give two controlled speeds, e. g. one for take-off and one for cruising, and provision may also be made, as shown in Fig. 8, for variation of the controlled speed by an external agency. To achieve this, the screw 20 can be replaced by a tappet 120 (Fig. 8) coacting with a lever 121 pivoted at 122 to the casing 2 of the unit and operable manually, hydraulically or electrically either to give two alternative settings to the tappet 120, corresponding respectively to the two controlled speeds, or to give a progressive variation in the controlled speed according to the position of the lever 121.

What I claim as my invention and desire to secure by Letters Patent is:

1. Fuel supply apparatus in combination with an engine for controlling the speed of the engine during acceleration thereof to a predetermined controlled speed, comprising a fuel pump driven by the engine arranged to deliver fuel at a pressure which increases with increase in the engine speed, a fuel supply conduit between said pump and said engine having therein two flow control orifices in series, an over-fuelling control valve controlling one of said orifices, means responsive to engine speed for automatically adjusting said over-fuelling control valve in relation to its orifice to restrict the flow of fuel from said pump to said engine, and thereby to prevent excessive over-fuelling of said engine, during an initial predetermined critical range of engine speeds and thereafter to permit of substantial over-fuelling of the engine during acceleration of said engine to a higher speed, a metering valve controlling the other of said orifices, and a speed governor which is ineffective until the engine has attained said higher speed and comprises a speed-responsive element and an acceleration-responsive element which are jointly effective on said metering valve, during acceleration of the engine from said higher speed to said controlled speed, to reduce the flow of fuel from the pump to the engine, thereby enabling the engine to accelerate gradually to the controlled speed without overshoot, said governor elements jointly controlling said metering valve to maintain the engine at the controlled speed when attained.

2. Fuel supply apparatus according to claim 1, wherein said over-fuelling control valve is a profiled needle valve and the means for adjusting said over-fuelling control valve comprise a pressure sensitive device coupled thereto and subject at one side to the delivery pressure of the pump and at the other to the fuel pressure at the inlet to the pump, and a spring for balancing said pressure sensitive device against the pressure difference across it, said valve moving progressively into its orifice as the engine speed increases and being so profiled as to permit of increased flow of fuel through said orifice after the engine has accelerated through said critical range.

3. Fuel supply apparatus in combination with an engine for controlling the speed of the engine during acceleration thereof to a predetermined controlled speed, comprising a fuel pump driven by the engine arranged to deliver fuel at a pressure which increases with increase in the engine speed, a fuel supply conduit between said pump and said engine having therein two flow control orifices in series, a profiled over-fuelling control valve controlling one of said orifices, a device responsive to engine speed for automatically adjusting said over-fuelling control valve in relation to its orifice to restrict the flow of fuel from said pump to said engine during acceleration thereof through an initial predetermined critical range of engine speeds and thereafter to a higher speed, the profile of said valve being such that it prevents excessive over-fuelling of said engine during said critical range of engine speeds but permits of substantial over-fuelling of the engine during acceleration of said engine to said higher speed, a metering valve controlling the other of said orifices, said metering valve being a profiled needle valve, a pressure operated device coupled to said metering valve, said pressure operated device being subject at one side to the delivery pressure of the pump or some proportion thereof and having a bleed across it, a spring balancing said pressure operated device against the pressure difference across it, a normally closed servo valve for controlling communication between the other side of said pressure sensitive device and the inlet to said pump, and a speed governor comprising a speed-responsive element and an acceleration-responsive element both operative on said servo valve only after the engine has attained said higher speed, said governor elements serving to open said servo valve during acceleration of the engine from the higher speed to the controlled speed and thereby to adjust said metering valve to reduce the flow of fuel to the engine, so that the engine accelerates gradually and without overshoot to the controlled speed, said governor elements controlling said servo valve and thereby also said metering valve to maintain the engine at the controlled speed when attained.

4. Fuel supply apparatus according to claim 3, comprising a loading spring for normally retaining said servo valve closed against the action of said speed governor, and means for regulating the loading of said loading spring and thereby altering the controlled speed of said engine.

5. Fuel supply apparatus in combination with an engine for controlling the speed of the engine during acceleration thereof to a predetermined controlled speed, comprising a centrifugal pump driven by the engine for supplying fuel to the engine at a delivery pressure determined by the engine speed, a first stage flow control means for restricting the flow of fuel from said pump to said engine operative only during acceleration of the engine through an initial predetermined critical range of engine speeds and during further acceleration of the engine to a higher speed and a second stage flow control means for restricting the flow of fuel from the pump to the engine operative during acceleration of the engine from said higher speed to said controlled speed, a device responsive to the delivery pressure of the pump for controlling said first stage flow control means, said device constituting the sole means for controlling said first stage control means and said first stage flow control means preventing excessive overfuelling of said engine during said critical range of engine speeds but thereafter permitting of substantial over-fuelling of the engine during acceleration thereof to said higher speed, a speed governor which is ineffective during initial acceleration of the engine but is automatically rendered effective by the time the engine has attained said higher speed, said speed governor comprising a speed-responsive element and an acceleration-responsive element, and means operable jointly by said two elements of the speed governor to control said second stage flow control means to accelerate said engine gradually from said higher speed to said controlled speed without overshoot, said second stage flow control means serving under control of said governor to maintain said engine at the controlled speed when attained.

6. Fuel supply apparatus according to claim 5, wherein the speed responsive element of the governor comprises an engine driven shaft, and bob weights mounted on said shaft and the acceleration responsive element of the governor comprises a flywheel mounted for rotation on said shaft, wherein said governor operable means comprises a servo valve, a spring normally holding said servo valve closed, a member responsive to the thrust of the bob weights and also to thrust from the flywheel, when the latter lags behind the shaft during periods of acceleration, for exerting pressure on the servo valve in opposition to the spring, and wherein said second stage flow control means comprises a servo-controlled metering valve operative in response to opening of said servo valve to effect first a reduction in the rate of fuel flow to the engine and thereafter to maintain the engine running at the controlled speed.

7. Fuel supply apparatus in combination with an engine for controlling the speed of the engine during acceleration thereof to a predetermined controlled speed, comprising a fuel pump driven by the engine arranged to deliver fuel at a pressure which increases with increase in the engine speed, a fuel supply conduit between said pump and said engine having two flow control orifices therein, a first flow control valve coacting with one of said orifices to control the flow of fuel to the engine during initial acceleration thereof through a critical range of engine speeds and during further acceleration thereof to a higher speed, a second flow control valve coacting with the other of said orifices to control the flow of fuel of the engine during acceleration thereof from said higher speed to said controlled speed, a device responsive to engine speed for progressively displacing said first valve in relation to its orifice during acceleration of the engine to said higher speed, said valve and orifice being shaped to permit of a small degree only of over-fuelling of the engine during acceleration thereof through said critical range of speeds, but to allow of substantial overfuelling of the engine during subsequent acceleration thereof to said higher speed, a speed governor, comprising a speed-responsive and an acceleration-responsive element, for controlling the portion of said second valve in its orifice, and means for rendering said speed governor ineffective on said second valve until the engine has attained said higher speed, said governor thereafter actuating said second valve to cause gradual acceleration of the engine from the higher speed to the controlled speed and to maintain the engine at the controlled speed.

References Cited in the file of this patent

UNITED STATES PATENTS

| | | |
|---|---|---|
| 2,472,181 | Werth | June 7, 1949 |
| 2,557,526 | Bobier et al. | June 19, 1951 |
| 2,559,938 | Carey | July 10, 1951 |
| 2,581,275 | Mock | Jan. 1, 1952 |
| 2,581,276 | Mock | Jan. 1, 1952 |
| 2,633,830 | McCourty et al. | Apr. 7, 1953 |
| 2,638,742 | Carey | May 19, 1953 |
| 2,643,513 | Lee | June 30, 1953 |

FOREIGN PATENTS

| | | |
|---|---|---|
| 959,467 | France | Oct. 3, 1949 |